(12) United States Patent
Shim

(10) Patent No.: US 11,825,256 B2
(45) Date of Patent: Nov. 21, 2023

(54) ELECTRONIC APPARATUS EMITTING ACOUSTIC SIGNAL THROUGH DISPLAY

(71) Applicant: LG ELECTRONICS INC., Seoul (KR)

(72) Inventor: Janghwan Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 17/099,732

(22) Filed: Nov. 16, 2020

(65) Prior Publication Data

US 2022/0046348 A1 Feb. 10, 2022

(51) Int. Cl.
| | |
|---|---|
| *H04R 1/02* | (2006.01) |
| *H05K 5/00* | (2006.01) |
| *H05K 5/02* | (2006.01) |
| *H04R 1/28* | (2006.01) |
| *H04B 11/00* | (2006.01) |
| *H04R 9/02* | (2006.01) |
| *H04R 9/06* | (2006.01) |

(52) U.S. Cl.
CPC ............ *H04R 1/028* (2013.01); *H04B 11/00* (2013.01); *H04R 1/2896* (2013.01); *H04R 9/025* (2013.01); *H04R 9/06* (2013.01); *H05K 5/0017* (2013.01); *H05K 5/02* (2013.01); *H04R 2400/11* (2013.01); *H04R 2499/15* (2013.01)

(58) Field of Classification Search
CPC . H04R 1/025; H04R 1/08; H04R 1/02; H04R 1/028; H04R 1/2896; H04R 2201/021; H04R 2201/023; H04R 5/02; H04R 5/023; H04R 2499/11; H04R 2499/15; H04R 2205/021; H04R 7/045; H04R 9/066; H04R 9/025; H04R 9/06; H04R 17/00; B60R 11/0217; B60R 2011/0045; H04N 5/642; H04B 11/00; H05K 5/0017; H05K 5/02
USPC .......................... 381/333, 87, 334, 152, 388
See application file for complete search history.

(56) References Cited

U.S. PATENT DOCUMENTS

| | | | |
|---|---|---|---|
| 10,491,987 B2 | 11/2019 | Huh et al. | |
| 2011/0287812 A1* | 11/2011 | Joo | H04M 1/185 455/566 |

(Continued)

FOREIGN PATENT DOCUMENTS

| | | |
|---|---|---|
| KR | 1020130028997 | 3/2013 |
| KR | 1020180040797 | 4/2018 |

(Continued)

OTHER PUBLICATIONS

PCT International Application No. PCT/KR2020/010486, International Search Report dated May 4, 2021, 4 pages.

*Primary Examiner* — Ahmad F. Matar
*Assistant Examiner* — Sabrina Diaz
(74) *Attorney, Agent, or Firm* — LEE, HONG, DEGERMAN, KANG & WAIMEY PC

(57) ABSTRACT

Provided is an electronic apparatus including a display, a frame supporting the display, and at least one actuator disposed at a rear side of the frame, the display vibrates based on driving of the at least one actuator to emit an acoustic signal to an outside, the frame includes a first portion and the and a second portion surrounding at least a part of the first portion, and the first portion and the second portion are formed of different materials. Various other embodiments are possible.

9 Claims, 23 Drawing Sheets

(56) References Cited

U.S. PATENT DOCUMENTS

| | | | |
|---|---|---|---|
| 2013/0064401 A1 | 3/2013 | Wang et al. | |
| 2014/0361669 A1* | 12/2014 | Jarvis | G06F 1/1637 |
| | | | 29/445 |
| 2015/0185963 A1* | 7/2015 | Lee | H04R 17/005 |
| | | | 345/177 |
| 2018/0267571 A1 | 9/2018 | Chen | |
| 2019/0196537 A1* | 6/2019 | Choi | H04R 7/045 |
| 2019/0230423 A1* | 7/2019 | Guo | F16F 15/08 |
| 2019/0369668 A1* | 12/2019 | Kim | G06F 1/1681 |
| 2020/0162802 A1 | 5/2020 | Kim | |
| 2020/0356746 A1 | 11/2020 | Koh et al. | |
| 2020/0401187 A1* | 12/2020 | Noh | G06F 1/1684 |

FOREIGN PATENT DOCUMENTS

| | | |
|---|---|---|
| KR | 1020190044329 | 4/2019 |
| KR | 1020190068336 | 6/2019 |

* cited by examiner

ELECTRONIC APPARATUS EMITTING ACOUSTIC SIGNAL THROUGH DISPLAY

CROSS-REFERENCE TO RELATED APPLICATION

Pursuant to 35 U.S.C. § 119, this application claims the benefit of earlier filing date and right of priority to International Application No. PCT/KR2020/010486, filed on Aug. 7, 2020, the contents of which are all hereby incorporated by reference herein in its entirety.

BACKGROUND

1. Field

The present disclosure relates to an electronic apparatus. One particular embodiment relates to an electronic apparatus that emits an acoustic signal through a display.

2. Description of the Related Art

With the recent development of digital technologies, various types of an electronic apparatus such as a mobile communication terminal, a smart phone, a tablet personal computer (PC), a notebook, a personal digital assistant (PDA), a wearable device, or a digital camera are widely used.

With the improved performance of the electronic apparatus, demands for a large-area display capable of more efficiently providing various functions are in increase. Meanwhile, miniaturization and thinning of the electronic apparatus are required for ease of portability, which, however, contradicts the electronic apparatus having the aforementioned large-area display. Accordingly, there are ongoing efforts to research and study an electronic apparatus that uses a flexible display having sufficient elasticity (for example, a foldable display, a rollable display, etc.) to fold or roll at least a part of the display for portability and to unfold or unroll the folded or rolled part as necessary.

SUMMARY

Meanwhile, electronic apparatuses generally use loud speakers as speaker devices for outputting various acoustic signals. Recently, as a method different from a loudspeaker, a flat type speaker in which the display itself serves as a diaphragm has been considered, but this has a problem of outputting an acoustic signal of remarkably lower quality than the loudspeaker, and thus it is not easily commercialized.

Various embodiments of the present disclosure provide an electronic apparatus capable of outputting an acoustic signal with improved quality through a display.

According to an aspect, there is provided an electronic apparatus including a display, a frame supporting the display, and at least one actuator disposed at a rear side of the frame, the display vibrates based on driving of the at least one actuator to emit an acoustic signal to an outside, the frame includes a first portion and a second portion surrounding at least a part of the first portion, and the first portion and the second portion are formed of different materials.

According to another aspect, there is provided an electronic apparatus including a display having a first region and a second region, a first frame supporting the first region, a second frame supporting the second region, a first actuator disposed at a rear side of the first frame, a second actuator disposed at a rear surface of the second frame, and a hinge module connecting the first frame and the second frame so that the first frame and the second frame are foldable in synchronization with each other, the first frame includes a first portion and a second portion surrounding at least a part of the first portion, and the first portion is formed of a material having a density different from a density for the second portion or has a thickness thinner than a thickness of the second portion.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
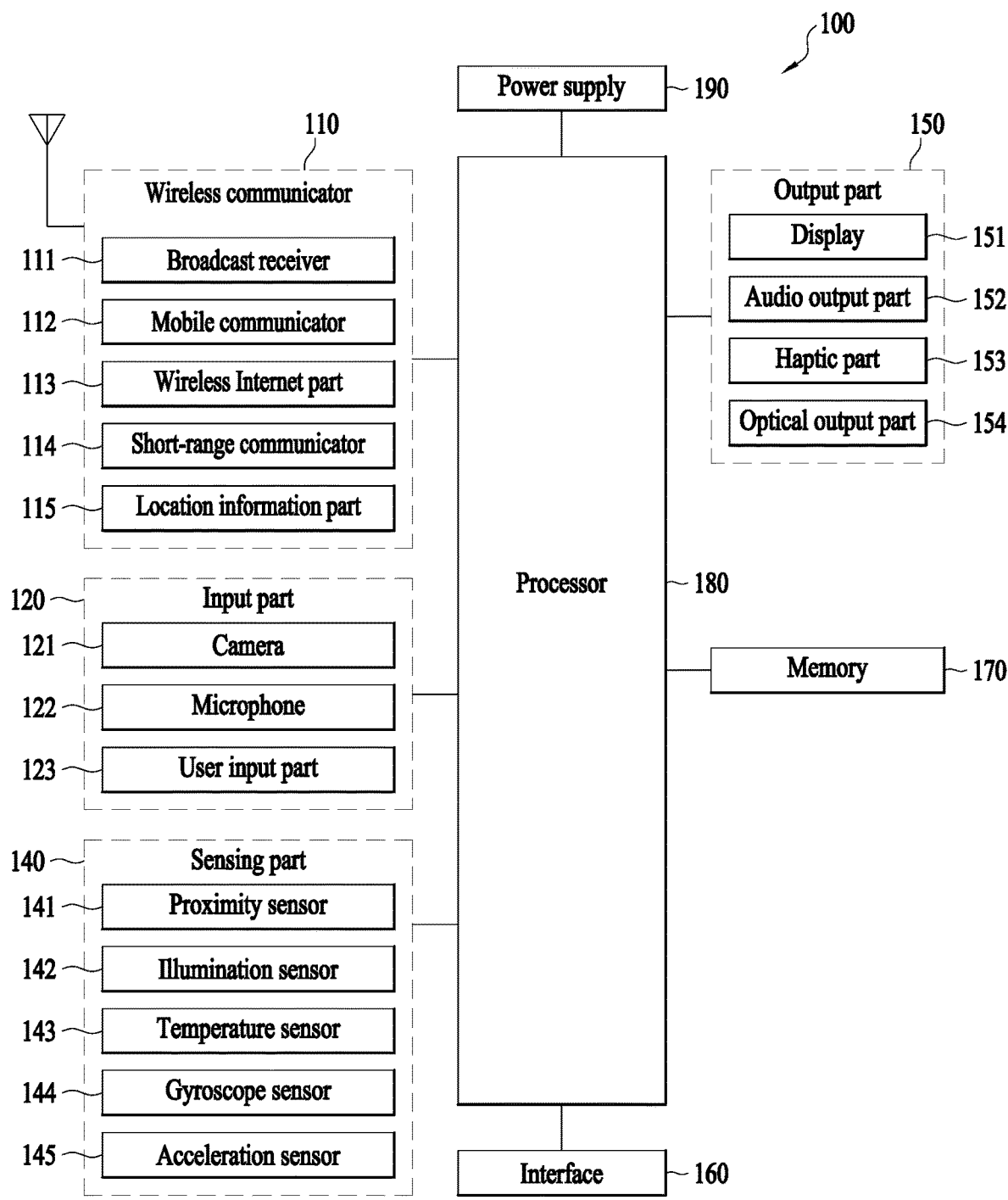
FIG. 1 is a block diagram of an electronic apparatus according to various embodiments of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram of an electronic apparatus according to various embodiments of the present disclosure.

Referring to FIG. 1, an electronic apparatus 100 according to various embodiments may include a wireless communicator 110, an input part 120, a sensing part 140, an output part 150, an interface part 160, a memory 170, a processor 180, and a power supply part 190.

The electronic apparatus 100 according to various embodiments of the present disclosure may include other elements in addition to the elements illustrated in FIG. 1, and may include only some of the elements illustrated in FIG. 1.

The wireless communicator 110 may include one or more modules that enable wireless communication between the electronic apparatus 100 and a wireless communication system, between the electronic apparatus 100 and another electronic apparatus (not shown) (for example, the electronic apparatus 100), or between the electronic apparatus 100 and an external server. The wireless communicator 110 may include one or more modules that connect the electronic apparatus 100 to one or more networks. For example, the wireless communicator 110 may include at least one of a broadcast receiver 111, a mobile communicator 112, a wireless Internet part 113, a short-range communicator 114, or a location information part 115.

The input part 120 may include an image input part (for example, a camera 121) to receive an image signal input, an audio input part (for example, a microphone 122) to receive an acoustic signal input, or a user input part 123 to receive a user input. For example, the user input part 123 may receive a user touch input through a touch sensor (or a touch panel) provided in a display 151 or may receive a user input through a mechanical key. Information (for example, voice data, image data, etc.) collected by the input part 120 may be analyzed and processed as a user's control command.

The sensing part 140 may include one or more sensors for sensing internal information of the electronic apparatus 100, the surrounding environment of the electronic apparatus 100, user information, and the like.

For example, the sensing part 140 may include a proximity sensor 141, an illumination sensor 142, a temperature sensor 143, a gyroscope sensor 144, or an acceleration sensor 145. In addition, the sensing part 140 may include at least one of a touch sensor, a finger scan sensor, a magnetic sensor, a G-sensor, a motion sensor, an RGB sensor, an infrared (IR) sensor, a ultrasonic sensor, an optical sensor, a battery gage, an environment sensor (for example, a barometer, a hygrometer, a thermometer, a radiation detection sensor, a thermal detection sensor, a gas detection sensor, etc.), or a chemical sensor (for example, an electronic nose, a health care sensor, a biometric sensor, etc.).

On the other hand, the electronic apparatus 100 disclosed herein may utilize information in such a manner of combining information sensed by at least two sensors of those sensors.

The output part 150 may output information associated with visual, auditory, or tactile sense. For example, the output part 150 may include at least one of the display 151, an audio output part 152, a haptic part 153, or an optical output part 154.

In an embodiment, the display 151 may be interlayered or integrally formed with a touch sensor to implement a touch screen that provides a touch inputting function and a screen outputting function. For example, the touch screen may function not just as the user input part 123 for providing an input interface between the electronic apparatus 100 and a user, but also as the output part 150 for providing an output interface between the electronic apparatus 100 and the user.

Meanwhile, the electronic apparatus 100 according to various embodiments may include a rollable, bendable, or foldable flexible display as the display 151. For example, the flexible display may have a screen output characteristic identical or similar to that of an existing flat display and at the same time may be formed in a thin and flexible substrate so that the flexible display can be bent, folded, twisted, or rolled.

For example, the flexible display may be combined with a touch sensor to implement a flexible touch screen. For example, the processor 180 may sense a touch input through the flexible touch screen of the flexible display and perform various functions corresponding to the touch input.

The electronic apparatus 100 may further include a deformation sensing means (not shown) for sensing deformation of the flexible display. For example, the electronic apparatus 100 may sense a change in the shape of the flexible display using at least one element of the sensing part 140. For example, on the basis of a change of the shape of the flexible display, which is detected using at least one of the deformation detecting means (not shown) or the sensing part 140, the processor 180 may change and output information to be displayed on the flexible display or may generate a predetermined control signal.

For example, the change in the shape of the flexible display may include a change in area of a flexible display region which is visible through a first side (for example, a front side) of the electronic apparatus 100 and which outputs an image to an outside in a first direction. For example, as a partial region of the flexible display is rolled, folded, or bent, the area of an image output region of the flexible display, the region facing in the first direction, may increase or decrease.

The above-described change in the shape of the flexible display may occur based on an external force by a user, but not limited thereto. For example, the electronic apparatus 100 (for example, the processor 180) may automatically change the shape of the flexible display based on an input applied through the input part 120 or the sensing part 140 or a specific application command.

The audio output part 152 may output audio data to an outside, the audio data which is received from the wireless communicator 110 in response to a call signal reception, a call or recording mode, a voice recognition mode, a broadcast receiving mode, etc. or which is previously stored in the memory 170. For example, the audio output part 152 may output an acoustic signal related to a function (for example, call signal reception sound, message reception sound, etc.) performed by the electronic apparatus 100. For example, the audio output part 152 may include at least one of a receiver, a speaker, or a buzzer.

The haptic part 153 may generate various tactile effects that a user can feel. A typical example of the tactile effects generated by the haptic part 153 may include a vibration. The intensity and pattern of the vibration generated by the haptic part 153 may be determined by selection of a user or by setting of the processor 180. For example, the haptic part 153 may combine different vibrations and output the combined vibration, or may sequentially output different vibrations.

The optical output part 154 may output a signal for notifying occurrence of an event using light from a light source of the electronic apparatus 100. For example, the event generated in the electronic apparatus 100 may include at least one of message reception, call signal reception, a missed call, an alarm, a schedule notice, an email reception, or an information reception through an application.

The interface part 160 may serve as a channel for external devices to be connected with the electronic apparatus 100. For example, the interface part 160 may include at least one of a wired or wireless port, an external charger port, a wired or wireless data port, a memory card port, a port for connecting a device having an identification module, an audio input/output (I/O) port, a video I/O port, or an earphone port. The electronic apparatus 100 may perform a predetermined function or control associated with a connected external device in response to connection of the external device to the interface part 160.

The memory 170 may store data associated with various functions of the electronic apparatus 100. For example, the memory 170 may store a plurality of application programs or applications to be driven by the electronic apparatus 100, and data and instructions for operations of the electronic apparatus 100. For example, at least some of the application programs may be downloaded from an external server via wireless communication. Alternatively, in another example, at least some of the application programs may be pre-stored in the memory 170 for a predetermined function (for example, receiving a call, placing a call, receiving a message, sending a message, etc.). An application program stored in the memory 170 may be executed, for example, by the processor 180 to perform a predetermined operation (or function) of the electronic apparatus 100.

The processor 180 (e.g., controller) may control overall operations of the electronic apparatus 100. For example, the processor 180 may provide information to a user or process a predetermined function by processing signals, data, information, etc. that are input or output through the components of the electronic apparatus 100 or by driving an application program stored in the memory 170.

For example, the processor 180 may control at least some of the elements of the electronic apparatus 100 illustrated in FIG. 1 in order to drive an application program stored in the memory 170. The processor 180 may operate a combination of at least two or more of the elements included in the electronic apparatus 100 to drive the application program.

The power supply part 190 may receive external or internal power under the control of the processor 180 to supply power to each element included in the electronic apparatus 100. The power supply part 190 may include a battery 191 (see FIG. 2B). The battery may include an embedded battery or a detachable battery.

At least some of the elements of the electronic apparatus 100 described above may operate in cooperation with each other to implement an operation, control, or control method of the electronic apparatus 100 according to various embodiments described below. In addition, the operation, control, or control method of the electronic apparatus 100 may be implemented by driving at least one application program stored in the memory 170.

The electronic apparatus 100 and the display 151 according to various embodiments of the present disclosure may have a bar shape. However, the present disclosure is not limited to such a shape, and various shapes may be applied within a scope that does not contradict the characteristics of the present disclosure.

Figure 2A:
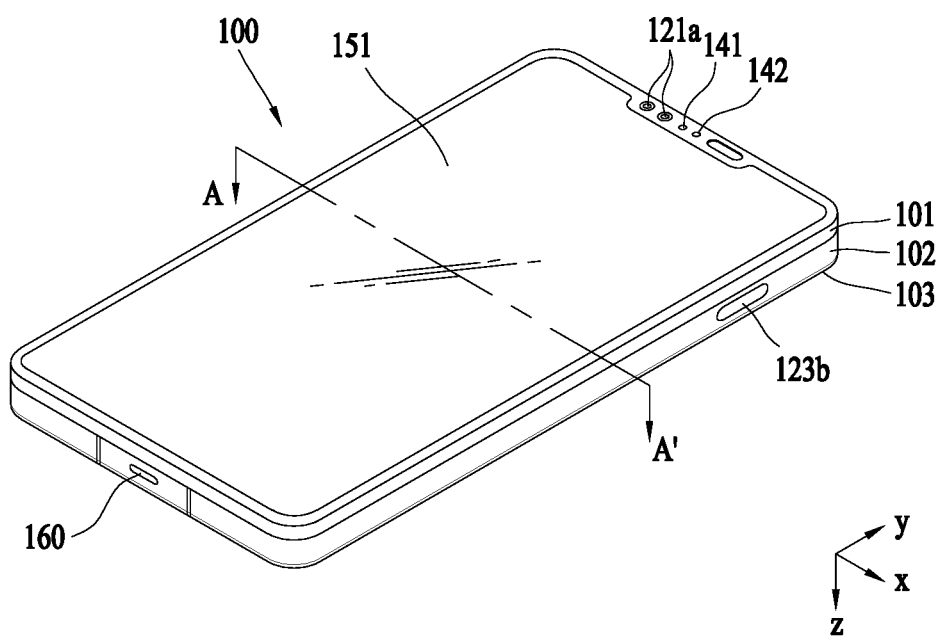
FIG. 2A is a front perspective view of an electronic apparatus according to an embodiment of the present disclosure.
Figure 2B:
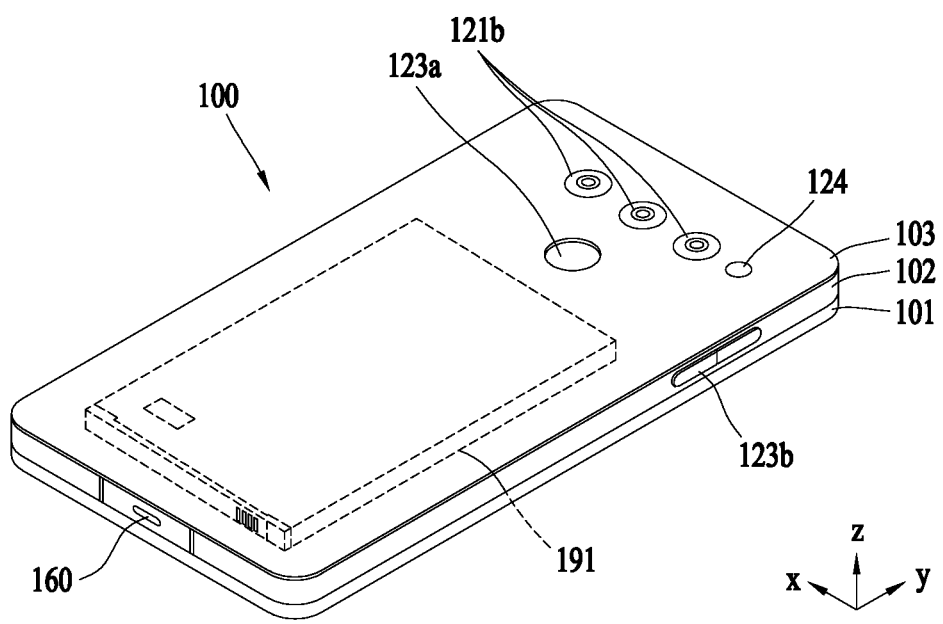
FIG. 2B is a rear perspective view of an electronic apparatus according to an embodiment of the present disclosure.

FIG. 2A is a front perspective view of an electronic apparatus according to an embodiment of the present disclosure. FIG. 2B is a rear perspective view of an electronic apparatus according to an embodiment of the present disclosure.

Referring to FIGS. 2A and 2B, an electronic apparatus 100 according to various embodiments may include at least one of a case, a frame, or a cover as a housing that forms an exterior of the electronic apparatus. For example, the electronic apparatus 100 according to an embodiment may include a front case 101 and a rear case 102 as illustrated in FIGS. 2A and 2B, and may further include a cover 103 for covering at least a portion of the rear case 102 that is optionally exposed on a rear side of the electronic apparatus 100.

According to various embodiments, the electronic apparatus 100 may include a display 151 which is visible through at least one side of the electronic apparatus 100 (for example, a front side, front and lateral sides, front and rear sides, etc.), and which outputs an image. For example, as illustrated in FIG. 2A, the display 151 may be mounted (or coupled) to the front case 101 to form the front side of the electronic apparatus 100 together with the front case 101.

According to various embodiments, various electronic components may be disposed in a space between the display 151 and the front case 101, a space between the front case 101 and the rear case 102, and/or a space between the rear case 102 and the rear cover 103.

In some cases, an electronic component may be mounted to the rear case 102. For example, the electronic component mountable to the rear case 102 may include at least one of a detachable battery 191, an identification module (for example, a SIM card), or a memory card. When an electronic component is mounted to the rear case 102, the rear cover 103 may be detachably coupled to cover the electronic component mounted to the rear case 102. Accordingly, when the rear cover 103 is separated from the rear case 102, the electronic components mounted to the rear case 102 may be exposed to an outside. When the rear cover 103 is coupled to the rear case 102, a part of a lateral side of the rear case 102 may be visually recognized. Meanwhile, unlike illustrated, the rear case 102 may be completely covered by the rear cover 103 being coupled to the rear case 102.

Unlike the foregoing description, the electronic apparatus 100 according to an embodiment does not additionally include the rear cover 103, and the rear case 102 may replace the function of the rear cover 103. The electronic apparatus 100 according to another embodiment may have a rear cover 103, which may be attached to the rear case 102 in a manner of not being detachable repeatedly.

Meanwhile, at least one of the front case 101, the rear case 102, or the rear cover 103 may include openings so that cameras 121a and 121b, user input parts 123a and 123b, and various interface parts 160 are exposed to an outside.

On the other hand, the electronic apparatus 100 according to various embodiments may not additionally have an opening (for example, a speaker hole) for transmitting an acoustic signal output from the audio output part 152 to the outside.

These cases (for example, the front case 101, the rear case 102, and the rear cover 103) may be formed by injection-molding synthetic resin or may be formed of a metal, for example, at least one of stainless steel (STS), aluminum (Al), or titanium (Ti).

In the electronic apparatus 100 according to various embodiments may be configured such that one case provides an inner space, unlike the above-described embodiment in which a plurality of cases provides an inner space for accommodating various electronic components. In this case, the electronic apparatus 100 may be implemented in the form of a uni-body that is formed in such a manner that synthetic resin or metal extends from a lateral side to a rear side.

The electronic apparatus 100 according to various embodiments may include at least one camera (for example, a first camera 121a, a second camera 121b), a proximity sensor 141, an illumination sensor 142, and a flash 124 (for example, the optical output part 154 of FIG. 1), a user input part (for example, a first user input part 123a, and a second user input part 123b), the interface part 160, and the like. These elements may be excluded or replaced if necessary or may be disposed at different positions than those shown in FIGS. 2A and 2B.

The display 151 may display (output) information processed by the electronic apparatus 100 as an image. For example, the display 151 may display execution screen information of an application program driven by the electronic apparatus 100, or User Interface (UI) and Graphic User Interface (GUI) information according to the execution screen information. For example, the display 151 may include at least one of a liquid crystal display (LCD), a thin film transistor-liquid crystal display (TFT-LCD), an organic light emitting diode (OLED), a flexible display, a three-dimensional (3D) display, or an e-ink display.

The display 151 may be implemented using two display devices depending on implementation of the electronic apparatus 100. For example, a first display may be disposed to face a first side (for example, a front side) of the electronic apparatus 100, and a second display may be disposed to face a second side (for example, a lateral side or a rear side) of the electronic apparatus 100.

Figure 3:
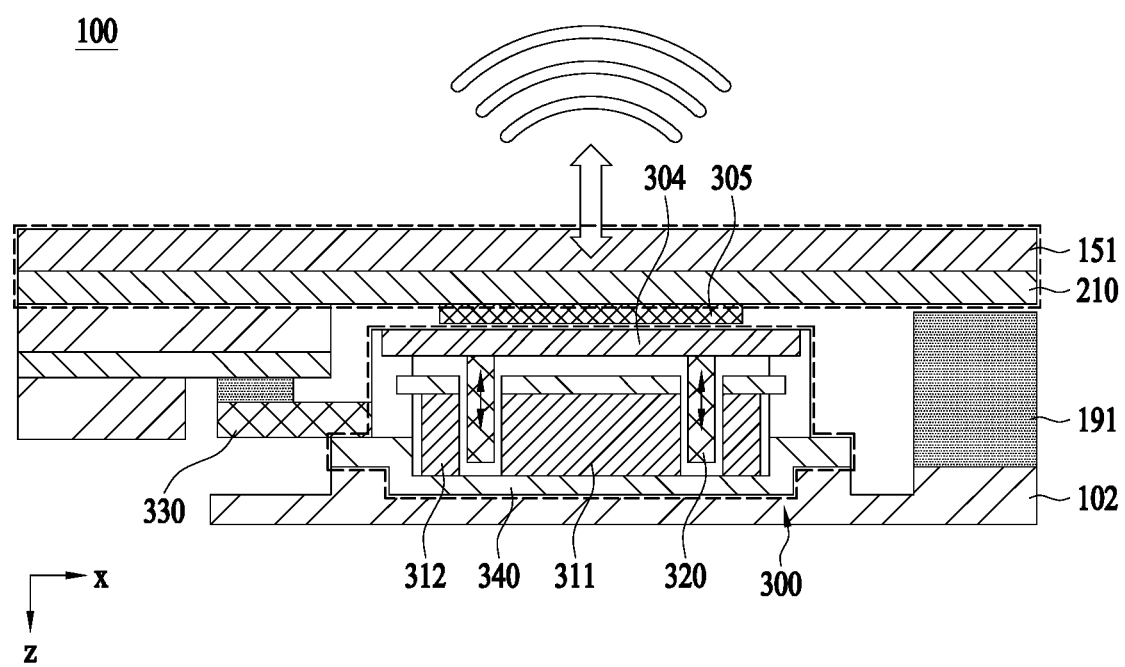
FIG. 3 is a schematic cross-sectional view for explaining a method of outputting an acoustic signal by an electronic apparatus according to an embodiment of the present disclosure.

FIG. 3 is a schematic cross-sectional view for explaining a method of outputting an acoustic signal by an electronic apparatus according to an embodiment of the present disclosure. For example, FIG. 3 may correspond to a partial cut-away cross-sectional view of the electronic apparatus 100 of FIG. 2A taken along the direction A-A'.

Referring to FIG. 3, an electronic apparatus 100 according to various embodiments may include a display 151, a frame 210, and an actuator 300.

The frame 210 is configured to support the display 151 from a rear side of the display 151, and may maintain the form of the display 151 to protect the display 151 and internal components of the electronic apparatus 100 from an external force when the display 151 is implemented as a flexible type and thus has a low stiffness, for example.

The actuator 300 may be disposed at a rear side of the frame 210. For example, the actuator 300 may be attached to the rear side of the frame 210 using an adhesive member 305.

The actuator 300 may vibrate the frame 210 and the display 151 in accordance with an electrical signal to generate a bending wave, thereby emitting an acoustic signal to an outside.

For example, the actuator 300 may include a magnetic circuit device, which generates a magnetic force based on an electrical signal, and a voice coil 320 which vibrates by the magnetic circuit device. For example, the magnetic circuit device may include at least one of a magnetic material (for example, a center magnet 311 and a side magnet 312), a plate 340 supporting the magnetic material, or a suspension 340 evenly distributing a vibration of the voice coil 320 to adjust an acoustic characteristic. The actuator 300 may receive an electrical signal from a printed circuit board 330 to vibrate the voice coil 320 in a vertical direction (the z and −z directions) of FIG. 3, and accordingly, the frame 210 and the display 151 may generate a bending wave.

Figure 4A:
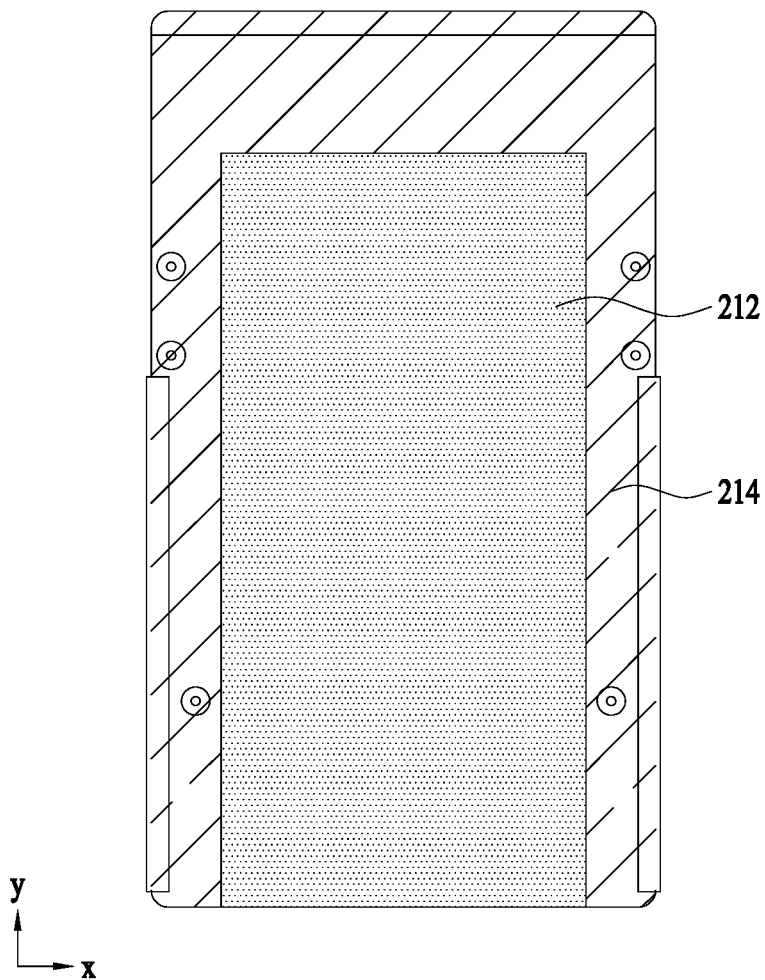
FIGS. 4A and 4B are diagrams schematically illustrating a frame of an electronic apparatus according to an embodiment of the present disclosure.
Figure 4B:
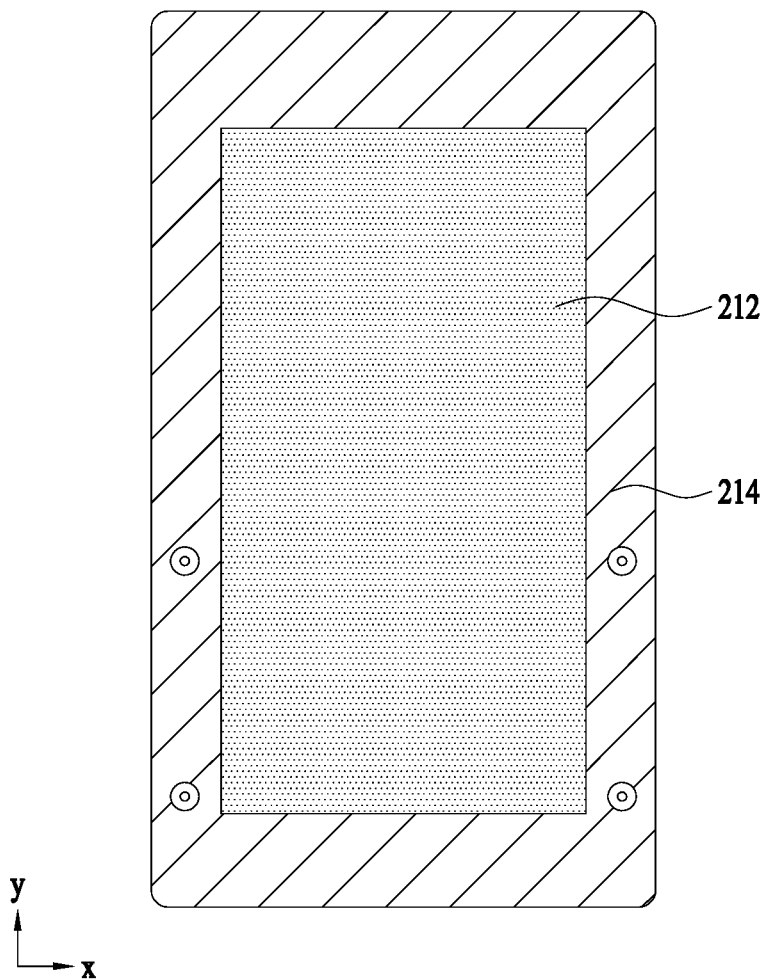

FIGS. 4A and 4B are diagrams schematically illustrating a frame of an electronic apparatus according to an embodiment of the present disclosure.

Referring to FIGS. 4A and 4B, in an electronic apparatus 100 according to various embodiments, a frame 210 for supporting a display 151 may include a first portion 212 and a second portion 214 partially surrounding the first portion 212.

The second portion 214 may have a shape completely surrounding the first portion 212, as illustrated in FIG. 4B, for example.

On the other hand, the second portion 214 may have a shape surrounding a part of the first portion 212, as illustrated in FIG. 4A. For example, the display 151 supported by the frame 210 may include a flexible display 151 in which a region for outputting an image through the front side of the electronic apparatus 100 is variable. For example, the display 151 may include a rollable display 151 in which an area of a display region outputting an image through the front side of the electronic apparatus 100 gradually increases (or decreases) as a part of the frame 210 moves in the +y direction.

According to an embodiment, the second portion 214 may be located at an outer part of the frame 210 corresponding to a region (for example, a bezel and a dead space) that does not output an image in the rest region of the display 151 facing the first side (for example, the front side) of the electronic apparatus 100.

According to various embodiments of the present disclosure, the first portion 212 and the second portion 214 of the frame 210 may be formed of different materials.

For example, the first portion 212 and the second portion 214 may be formed of materials having different densities (for example, areal densities). In addition, the first portion 212 and the second portion 214 may be formed of materials having different bending stiffnesses. The frame 210 may be formed by combining or attaching the first portion 212 and the second portion 214 formed of different materials.

The acoustic signal that can be output from the electronic apparatus 100 through the display 151 may change in characteristics according to at least one of a property or a shape of the frame 210 that supports the display 151.

For example, if the frame 210 has a lower stiffness and a higher density, a resonance frequency of an output acoustic signal may be lowered and a low frequency band acoustic characteristic may be enhanced. Meanwhile, if the frame 210 has a lower stiffness and a lower density, an acoustic impedance of the acoustic signal may become smaller and a sound pressure may become larger, thereby further improving an acoustic quality. The frame 210 according to various embodiments may be variously designed in consideration of performance of an acoustic signal to be output.

According to an embodiment, the first portion 212 of the frame 210 may be formed of a material having a relatively high stiffness, and the second portion 214 may be formed of a relatively soft material having a low stiffness. In this case, the second portion 214 may enhance a low frequency band acoustic characteristic and the first portion 212 may enhance a medium-high frequency band acoustic characteristic, thereby extending a reproduction bandwidth of an acoustic signal. For example, the first portion 212 may be formed of aluminum, and the second portion 214 may be formed of resin.

According to another embodiment, the first portion 212 of the frame 210 may be formed of a material having a relatively low stiffness, and the second portion 214 may be formed of a material having a relatively high stiffness.

According to another embodiment, the first portion 212 of the frame 210 may be formed of a material having a relatively low density, and the second portion 214 may be formed of a material having a relatively high density. Conversely, the first portion 212 may be formed of a material having a relatively high density, and the second portion 214 may be formed of a material having a relatively low density.

For example, when the frame 210 is formed of a material having a low density, a medium-high frequency band acoustic characteristic of an acoustic signal may be enhanced and an acoustic impedance may decrease to increase a sound pressure, thereby improving an acoustic quality. On the other hand, when the frame is formed of a material having a high density, a low frequency band characteristic of an acoustic signal may be enhanced.

For example, the first portion 212 and the second portion 214 of the frame 210 each may be formed of at least one of silicon, tungsten, copper, or carbon according to a required characteristic of an acoustic signal, and each may be formed of a different material.

Figure 5:
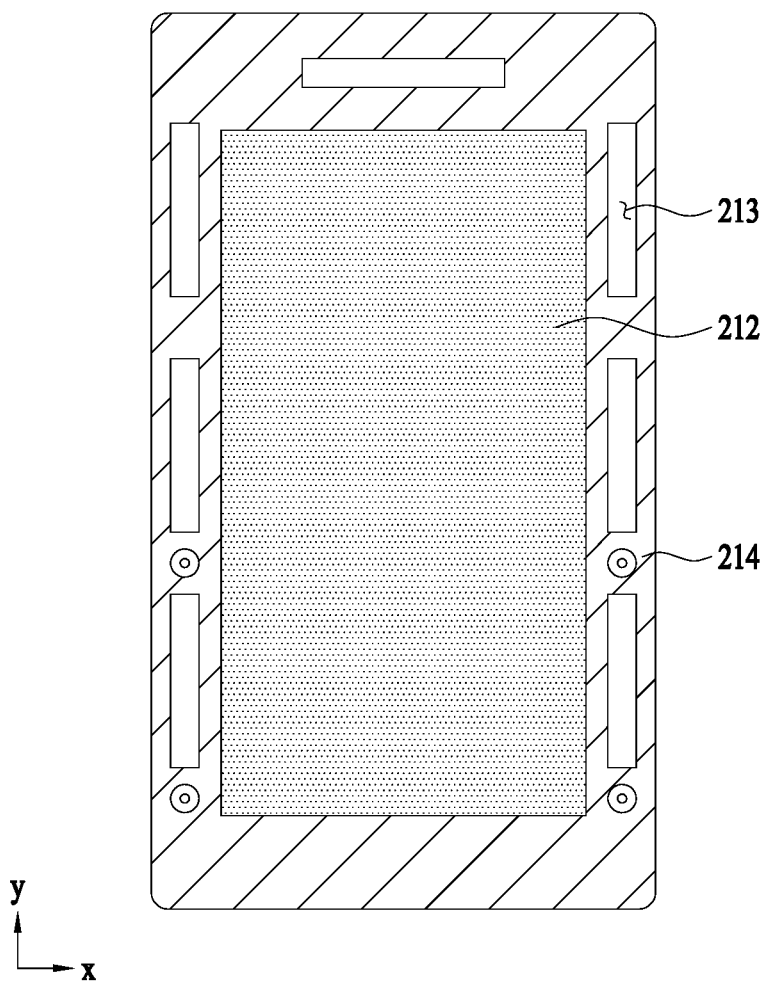
FIG. 5 is a diagram schematically illustrating a frame according to an embodiment of the present disclosure.

FIG. 5 is a diagram schematically illustrating a frame according to an embodiment of the present disclosure.

Referring to FIG. 5, the electronic apparatus 100 according to various embodiments may include a frame 210 having at least one opening 213 formed in the second portion 214. For example, the at least one opening 213 may be positioned to correspond to a structure (for example, a screw part) for coupling (or assembling) the frame 210 with the display 151, the rear case 102, or other electronic components. The shape, size, position, and number of the opening 213 in the frame 210 according to various embodiments are not limited to what is illustrated in FIG. 5, and may be determined based on various design factors.

As illustrated in FIG. 5, since the frame 210 includes at least one opening 213 within the second portion 214 surrounding at least a part of a first portion 212, the stiffness and weight of the frame 210 may be minimized and accordingly an acoustic impedance may be reduced, thereby improving an acoustic quality.

Meanwhile, since the at least one opening 213 is located in the second portion 214 rather than the first portion 212, the main function of the frame 210 for supporting the display 151 may not be interfered with.

According to various embodiments, in the frame 210 having at least one opening 213 in the second portion 214, the first portion 212 and the second portion 214 may be formed of different materials.

Figure 6:
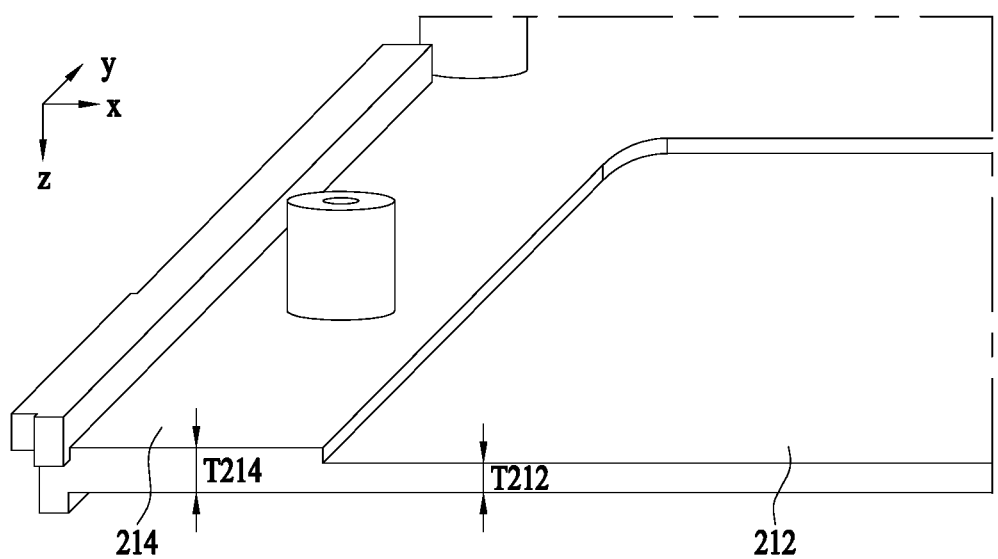
FIG. 6 is a partially cut-away perspective view schematically showing a frame according to an embodiment of the present disclosure.

FIG. 6 is a partially cut-away perspective view schematically showing a frame according to an embodiment of the present disclosure.

Referring to FIG. 6, a frame 210 according to an embodiment may have a stepped structure between a first portion 212 and a second portion 214 that surrounds at least a part of the first portion 212.

For example, a thickness T212 of the first portion 212 may be smaller than a thickness T214 of the second portion 214.

As the thickness of the first portion 212 is formed smaller than the thickness of the second portion 214 in the frame 210 according to various embodiments of the present disclosure, it is possible an overall weight of the frame 210 and accordingly improve a low frequency band acoustic characteristic of an acoustic signal.

In one embodiment, while the frame 210 has the stepped structure, the first portion 212 is formed of a low stiffness material and the second portion 214 is formed of a high stiffness material, so that the low frequency band acoustic characteristic can be further enhanced. Meanwhile, in another embodiment, while the frame 210 has the stepped structure, the first portion 212 is formed of a high stiffness material and the second portion 214 is formed of a low stiffness material, so that an output bandwidth of an acoustic signal can be extended.

Meanwhile, unlike illustrated, in an electronic apparatus 100 according to another embodiment, it is possible to control a characteristic of an acoustic signal by forming a thickness of the first portion 212 of the frame 210 to be larger than a thickness of the second portion 214 surrounding at least a part of the first portion 212.

Figure 7A:
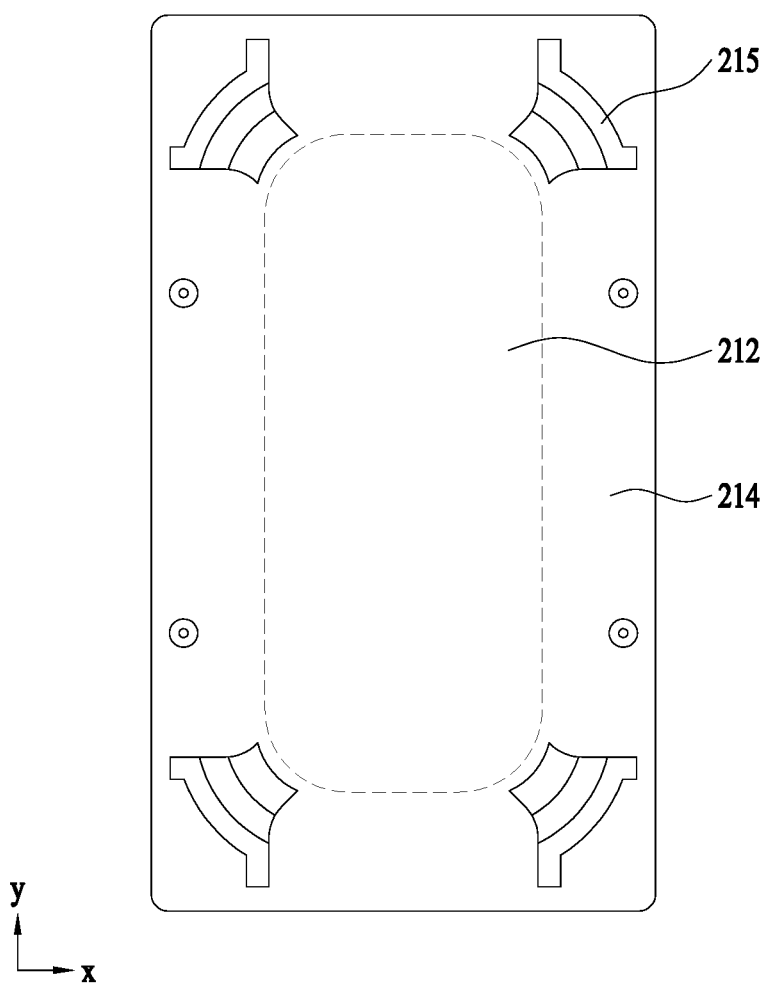
FIGS. 7A and 7B are schematic diagrams of frames according to various embodiments.
Figure 7B:
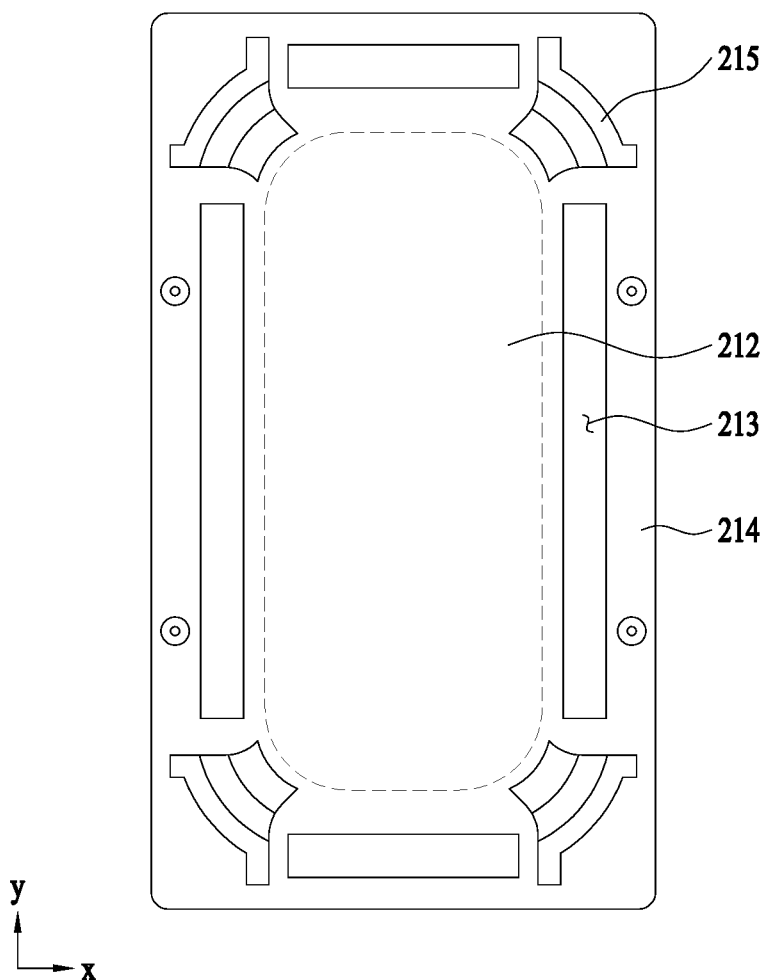

FIGS. 7A and 7B are schematic diagrams of a frame according to various embodiments.

As illustrated in FIGS. 7A and 7B, a frame 210 according to various embodiments includes at least one shock absorbing structure 215 within a second portion 214 that surrounds a first portion 212.

For example, the shock absorbing structure 215 may be located at each corner end of the second portion 214, and may have a three-dimensional structure partially protruding by a predetermined height from other parts of the second portion 214.

The shock absorbing structure 215 may buffer a vibration generated based on driving of an actuator 300 and may function to enhance a low frequency acoustic characteristic of an acoustic signal.

The frame 210 including the shock absorbing structure 215 may further include at least one opening 213 within the second portion 214 as illustrated in FIG. 7B.

In addition, the frame 210 is formed such that the first portion 212 and the second portion 214 having at least one of different densities, stiffnesses, or thicknesses, and thus, the frame 210 may have a complex structure to improve acoustic performance.

Figure 8A:
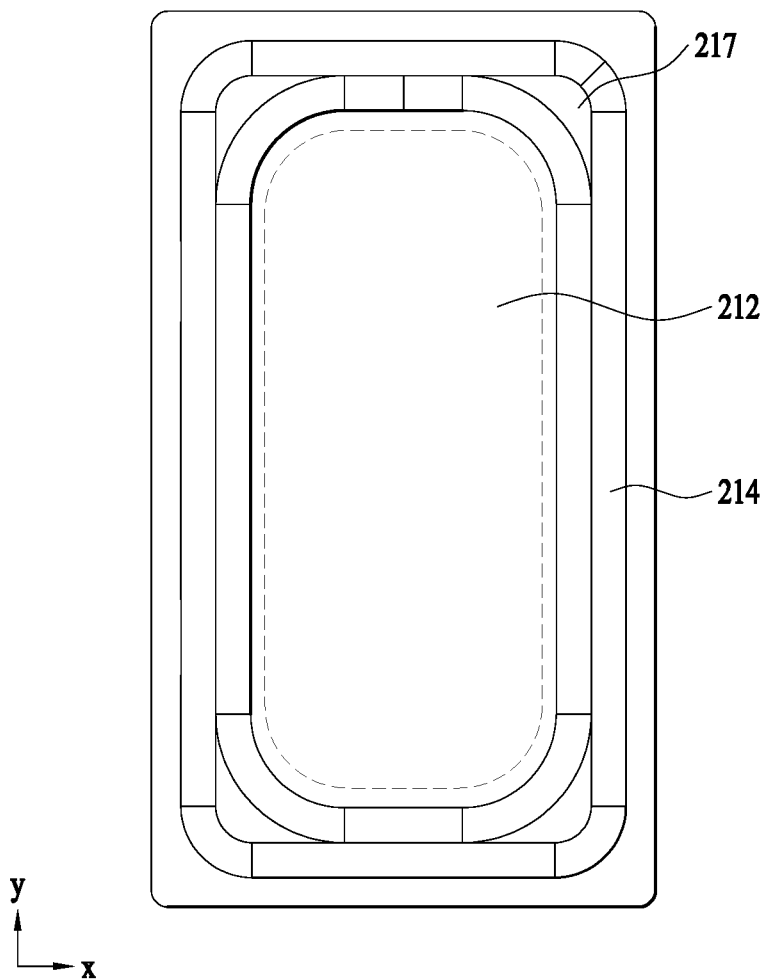
FIGS. 8A to 8C are schematic diagrams of frames according to various embodiments.
Figure 8B:
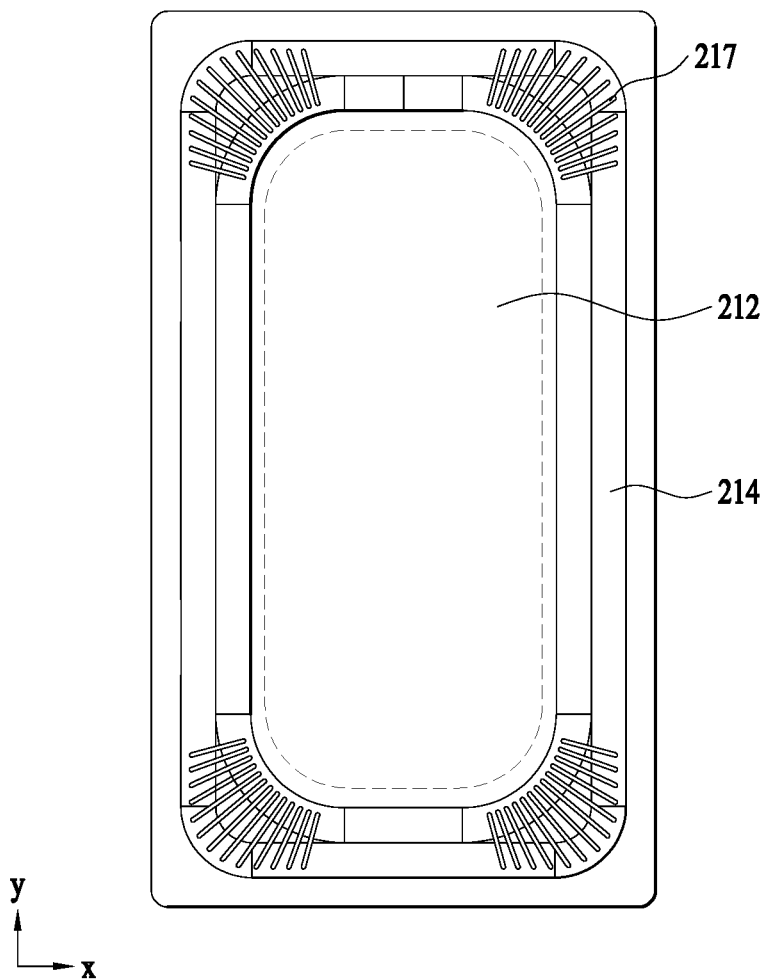
Figure 8C:
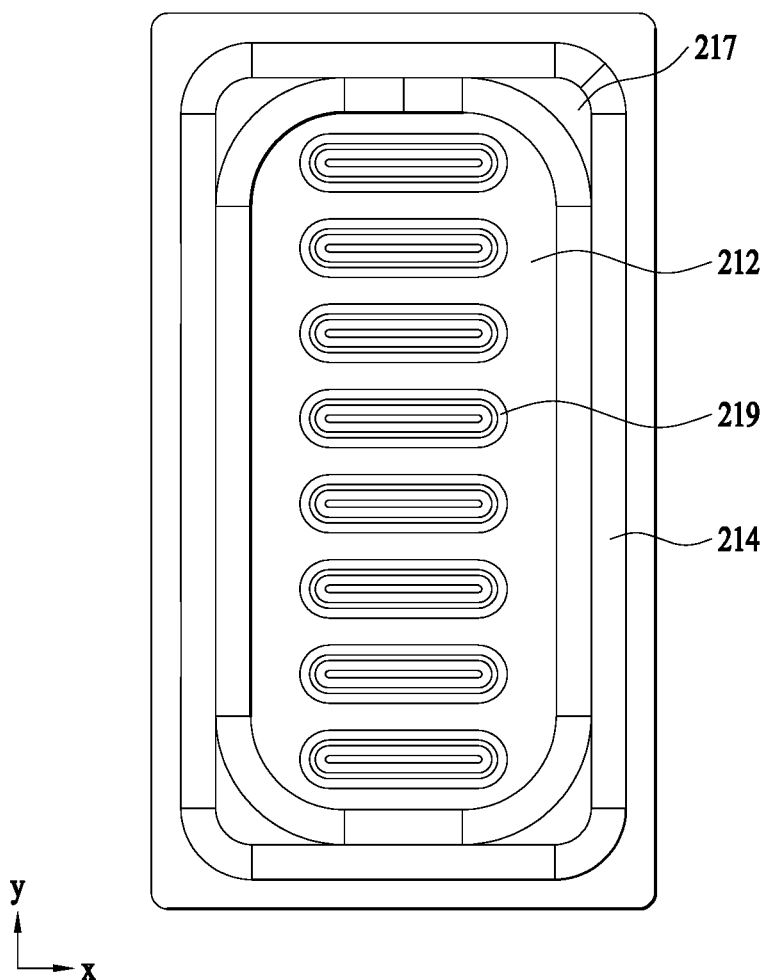

FIGS. 8A to 8C are schematic diagrams of a frame according to various embodiments.

As illustrated in FIGS. 8A to 8C, a frame 210 of an electronic apparatus 100 according to various embodiments may have a corrugation structure within a second portion 214 surrounding a first portion 212.

For example, as illustrated in FIG. 8A, the frame 210 according to an embodiment may include a three-dimensional structure 217 that is partially protruding by a predetermined height than other parts of the second portion 214 while surrounding the first portion 212 within the second portion 214. The three-dimensional structure 217 may be, when viewed from a direction facing a first side of the frame 210, understood as a form of ridges that partially protrude outward or may be, when viewed from a direction opposite to the first side, understood as a form of valleys that are partially recessed inward.

For example, the frame 210 according to an embodiment may further have a plurality of valleys that are recessed inward from respective corners of the three-dimensional structure 217, as illustrated in FIG. 8B.

The frame 210 according to another embodiment may further include a corrugation structure having a plurality of ridges 219 spaced apart from each other within the first portion 212, as illustrated in FIG. 8C. Other parts located in between the plurality of ridges protruding from the first portion 212 by a predetermined height may correspond to a plurality of valleys that are relatively recessed. For example, when the frame 210 shown in FIG. 8C is viewed from the opposite direction, the aforementioned ridges may be regarded as valleys and the aforementioned valleys may be regarded as ridges.

For example, according to a required acoustic characteristic, the corrugation structure may be included in the first portion 212 alone, the second portion 214 alone, or both the first portion 212 and the second portion 214. For example, since the frame 210 has the above-described corrugation structure, a stiffness of the frame 210 may be adjusted, and, by doing so, the electronic apparatus 100 may be designed to output an acoustic signal corresponding to a predetermined acoustic characteristic.

The electronic apparatus 100 according to various embodiments of the present disclosure may include a frame 210 having any one of characteristics of the above-described embodiments, a frame 210 having a plurality of characteristics except for some of the above-described embodiments, or a frame 210 having all the characteristics of the above-described embodiments.

FIGS. 9A to 9D are diagrams for explaining a structure of an electronic apparatus according to an embodiment of the present disclosure.

Figure 9A:
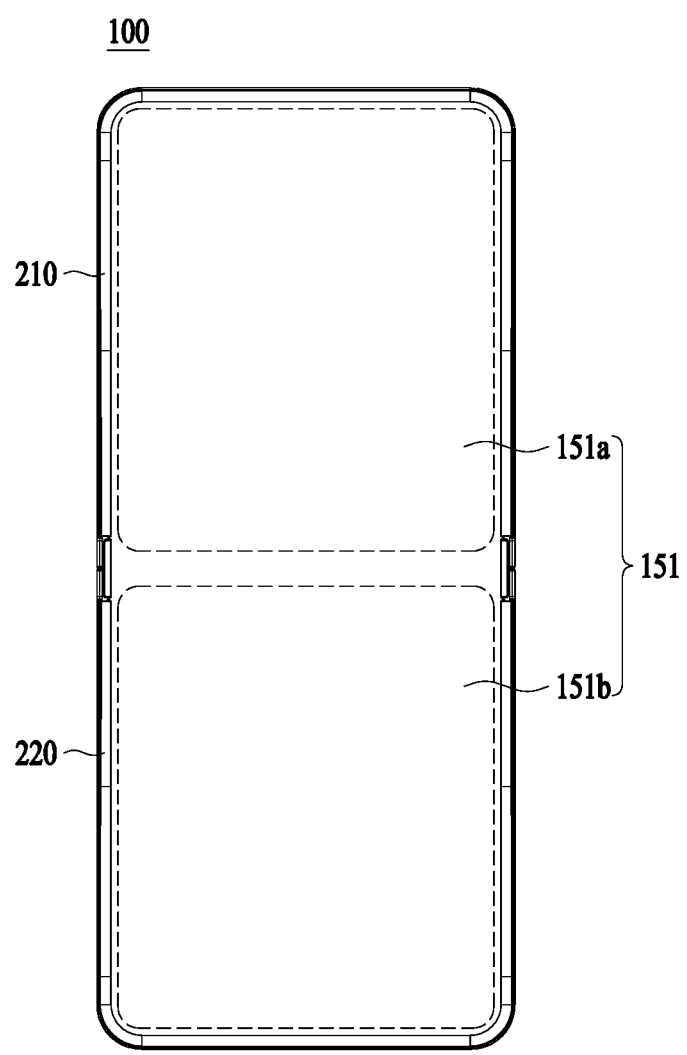
FIGS. 9A to 9D are diagrams for explaining a structure of an electronic apparatus according to an embodiment of the present disclosure.
Figure 9B:
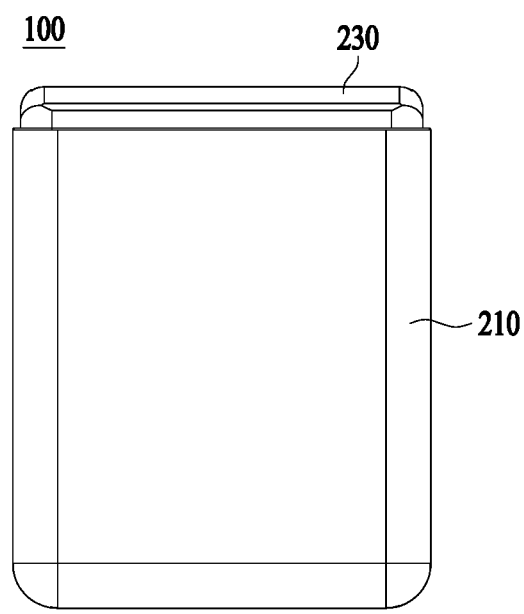
Figure 9C:
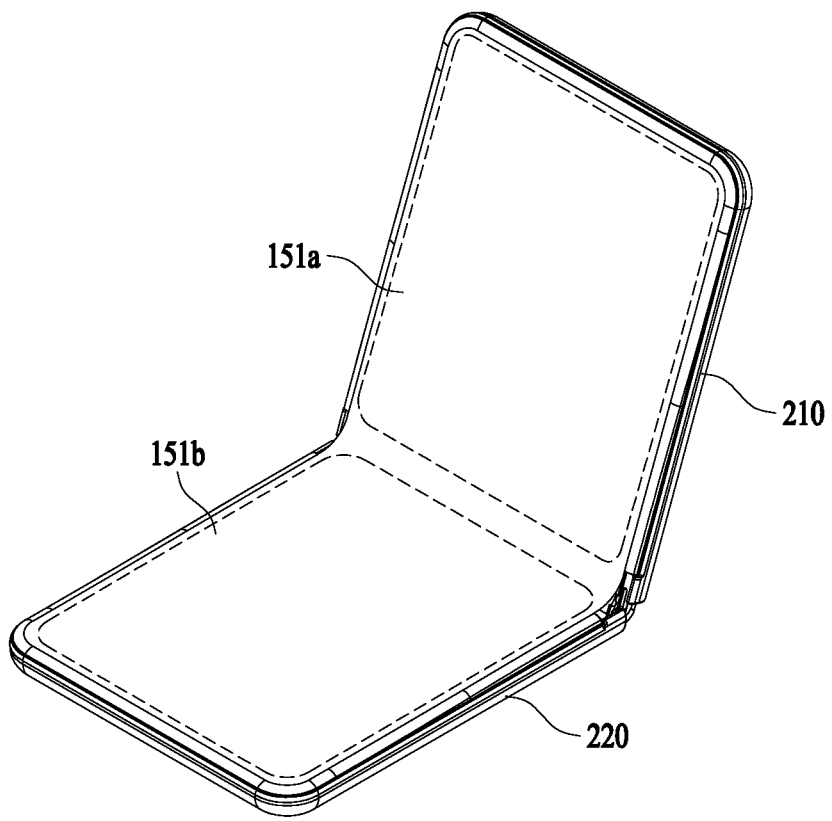
Figure 9D:
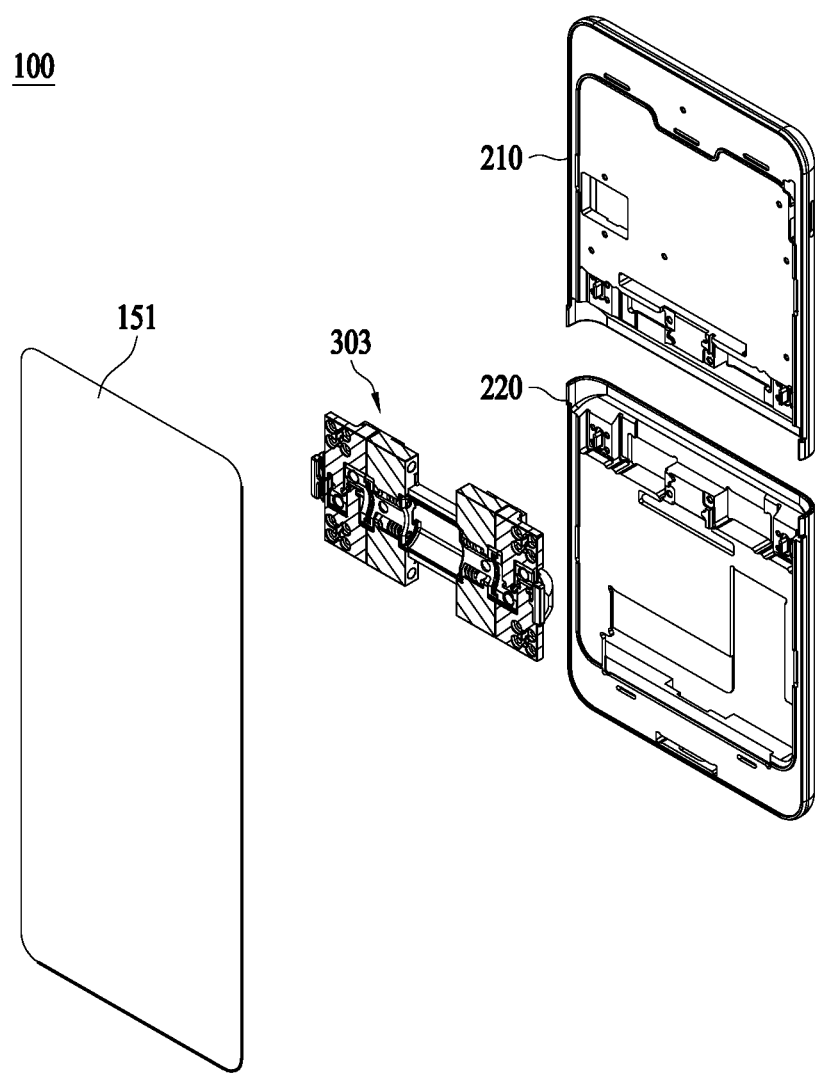

Specifically, FIG. 9A is a front view illustrating a state in which an electronic apparatus 100 according to an embodiment is unfolded, FIG. 9B is a front view illustrating a state in which the electronic apparatus 100 of FIG. 9A is folded, and FIG. 9C is a perspective view schematically illustrating a state in which the electronic apparatus 100 is partially folded. FIG. 9D is a schematic exploded perspective view of the electronic apparatus 100 according to an embodiment.

Referring to FIGS. 9A to 9D, the electronic apparatus 100 according to various embodiments may have a foldable structure to be folded or unfolded around a region (for example, a region between a first frame 210 and a second frame 220).

According to an embodiment, the electronic apparatus 100 may include a flexible display 151 including a first region 151a and a second region 151b.

The electronic apparatus 100 may include the first frame 210 and the second frame 220 as a plurality of frames spaced apart from each other. For example, the first region 151a of the display 151 may be supported by the first frame 210, and the second region 151b of the display 151 may be supported by the second frame 220. The first frame 210 and the second frame 220 may be connected to each other through a hinge module 303.

The first frame 210 and the second frame 220 may be integrally rotated by the hinge module 303 in a direction closer to each other or in a direction away from each other, and accordingly, the positional relationship between the first region 151a and the second region 151b of the display 151 may vary.

For example, when the electronic apparatus 100 is completely unfolded as illustrated in FIG. 9A, the first region 151a and the second region 151b may be substantially disposed on the same plane and therefore output image information in one direction.

In addition, when the electronic apparatus 100 is completely folded as illustrated in FIG. 9B, the first region 151a and the second region 151b may be disposed to face each other and therefore the first region 151a and the second region 151b may not be visible from an outside.

Although not illustrated, the electronic apparatus 100 may further include at least one actuator (for example, the actuator 300).

For example, the electronic apparatus 100 may include a first actuator disposed at a rear side of the first frame 210, and a second actuator disposed at a rear side of the second frame 220. The first actuator and the second actuator may have the same configuration as that of the actuator 300 described with reference to FIG. 3.

According to an embodiment, the display 151 may further include a third region between the first region 151a and the second region 151b. The third region is a region continuously connected to the first region 151a and the second region 151b, and may output image information or receive (detect) a touch input so as do the first region 151a and the second region 151b.

Meanwhile, according to another embodiment, unlike those shown in FIGS. 9A to 9D, a first display of the first region 151a supported by the first frame 210 and a second display of the second region 151b supported by the second frame 220 may be provided as individual devices, and the first display and the second display may be mounted to be rotated in conjunction with each other by the hinge module 303.

Figure 10:
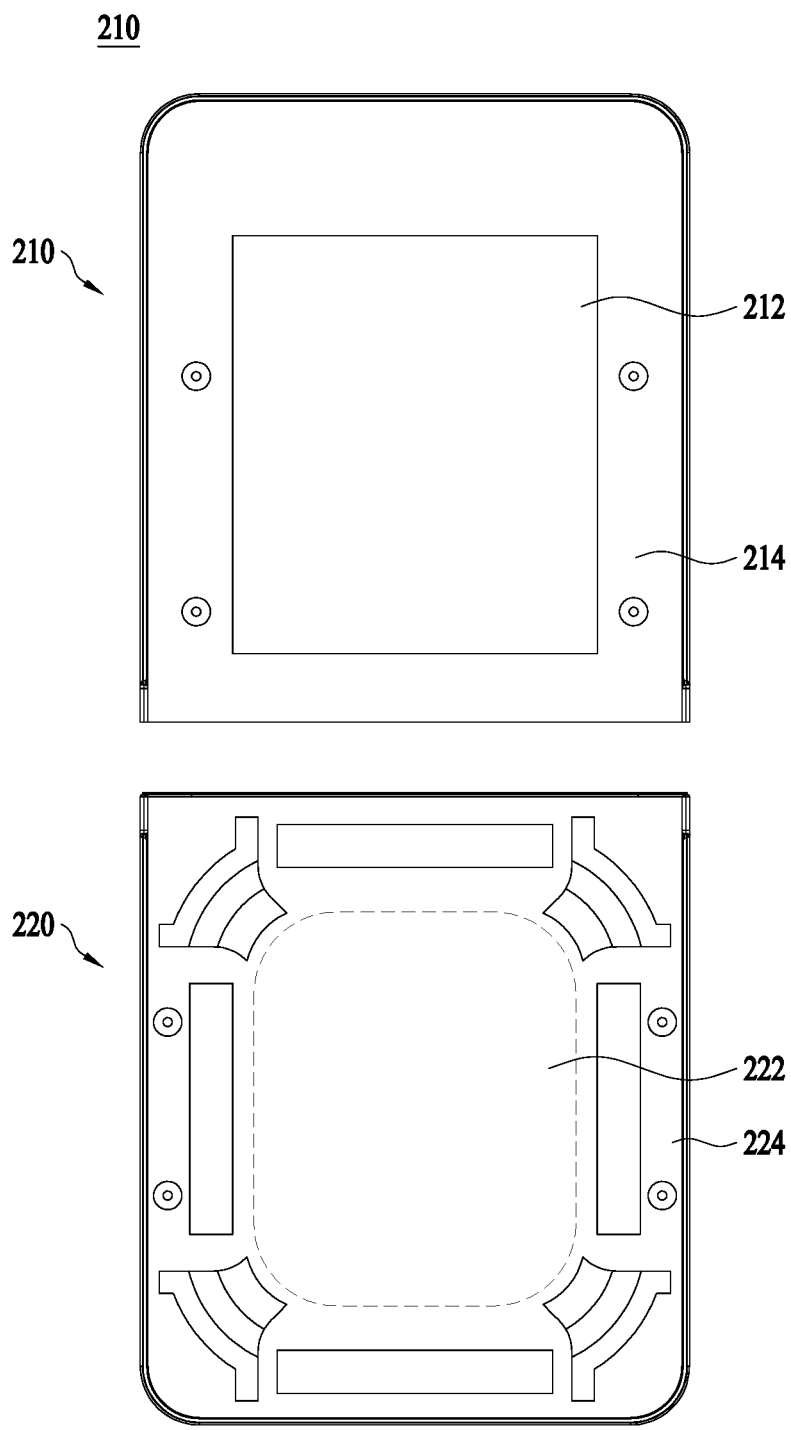
FIG. 10 is a diagram schematically illustrating a first frame and a second frame of an electronic apparatus according to an embodiment of the present disclosure.

FIG. 10 is a diagram schematically illustrating a first frame and a second frame of an electronic apparatus according to an embodiment of the present disclosure.

Referring to FIG. 10, a first frame 210 supporting a first region 151a of a display 151 may include a first portion 212 and a second portion 214 surrounding at least a part of the first portion 212. In addition, a second frame 220 supporting a second region 151b of the display 151 may include a third portion 222 and a fourth portion 224 surrounding at least a part of the third portion 222.

According to various embodiments, the first frame 210 and the second frame 220 may have different structures, and accordingly, an acoustic signal emitted through the first region 151a of the display 151 and an acoustic signal emitted through the second region 151b of the display 151 may have different acoustic characteristics.

For example, based on the structural characteristics of the first frame 210 and the second frame 220, an acoustic signal transmitted to the outside through the first region 151a may have a higher frequency band characteristic compared to that of an acoustic signal transmitted through the second region 151b.

On the contrary, based on the structural characteristics of the first frame 210 and the second frame 220, an acoustic signal transmitted to the outside through the first region 151a may have a lower frequency band characteristic compared to that of an acoustic signal transmitted through the second region 151b.

For example, in the first frame 210, the first portion 212 and the second portion 214 may be formed of different materials. For example, the first portion 212 and the second portion 214 may be formed of materials having at least one of different densities or different stiffnesses. In addition, in the second frame 220, the fourth portion 224 surrounding the third portion 222 may include therein at least one opening and/or at least one shock absorbing structure.

For example, the first frame 210 may have a stepped structure as the first portion 212 and the second portion 214 are formed with different thicknesses, and the third portion 222 and the fourth portion 224 of the second frame 220 may also be formed of different materials.

The first frame 210 and the second frame 220 according to various embodiments may include at least some of the embodiments of the present disclosure such that an inner portion (for example, the first portion 212 and the third portion 222) and an outer portion (for example, the second portion 214 and the fourth portion 224) are formed of materials having different characteristics or are formed with different thicknesses or such that at least one of an opening, a shock absorbing structure, or a corrugation structure is formed in a specific portion.

FIGS. 11A to 11E are diagrams for explaining a structure of an electronic apparatus according to an embodiment of the present disclosure.

Figure 11A:
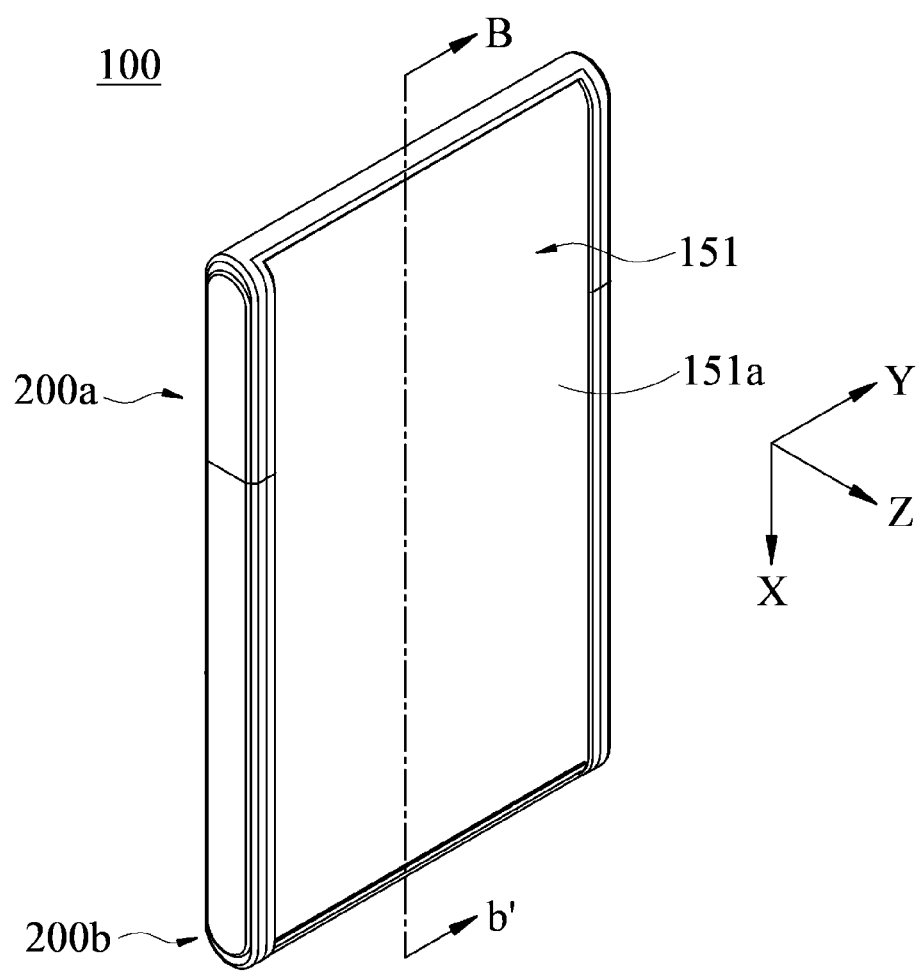
FIGS. 11A to 11E are diagrams for explaining a structure of an electronic apparatus according to an embodiment of the present disclosure.
Figure 11B:
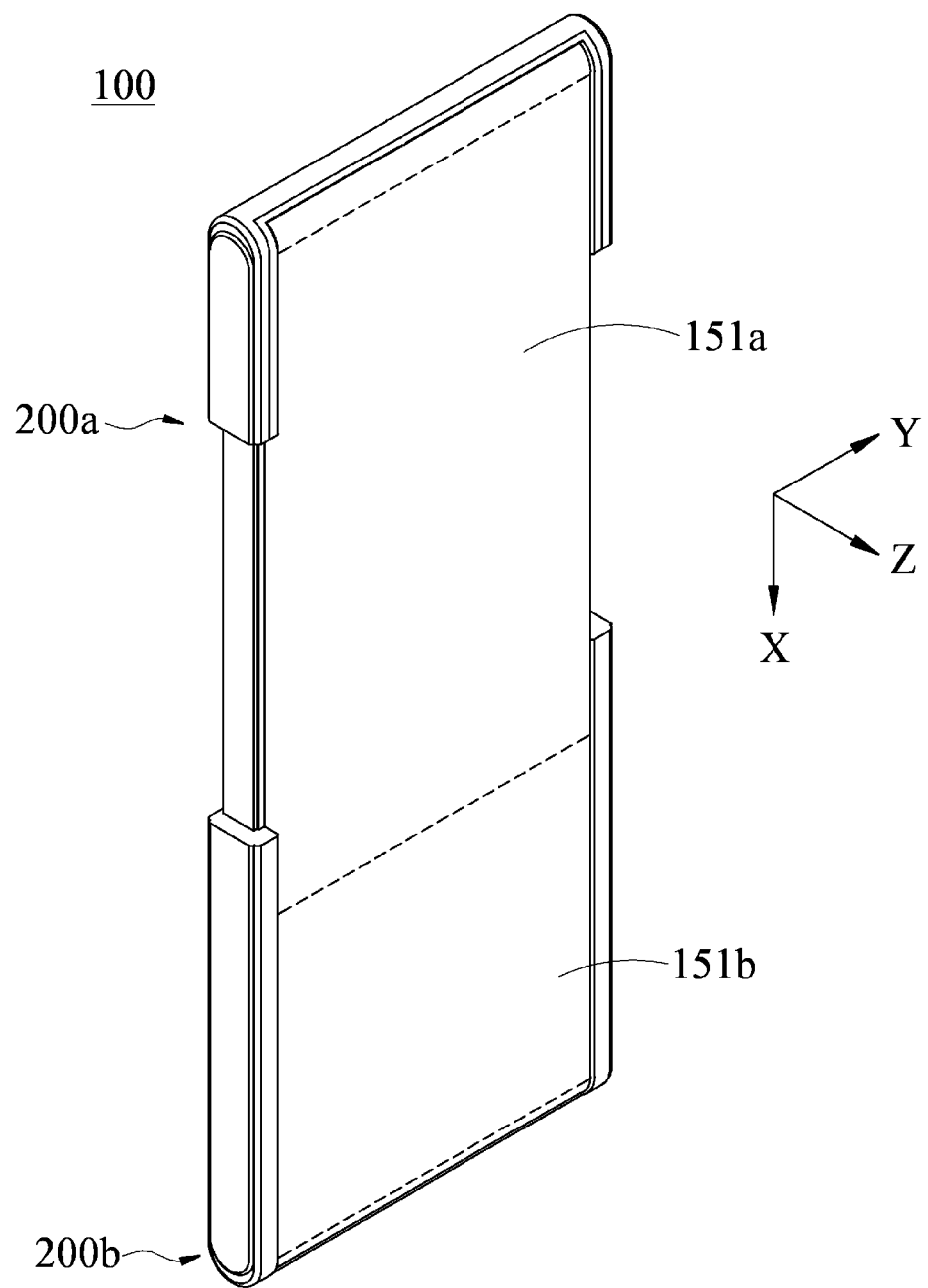
Figure 11C:
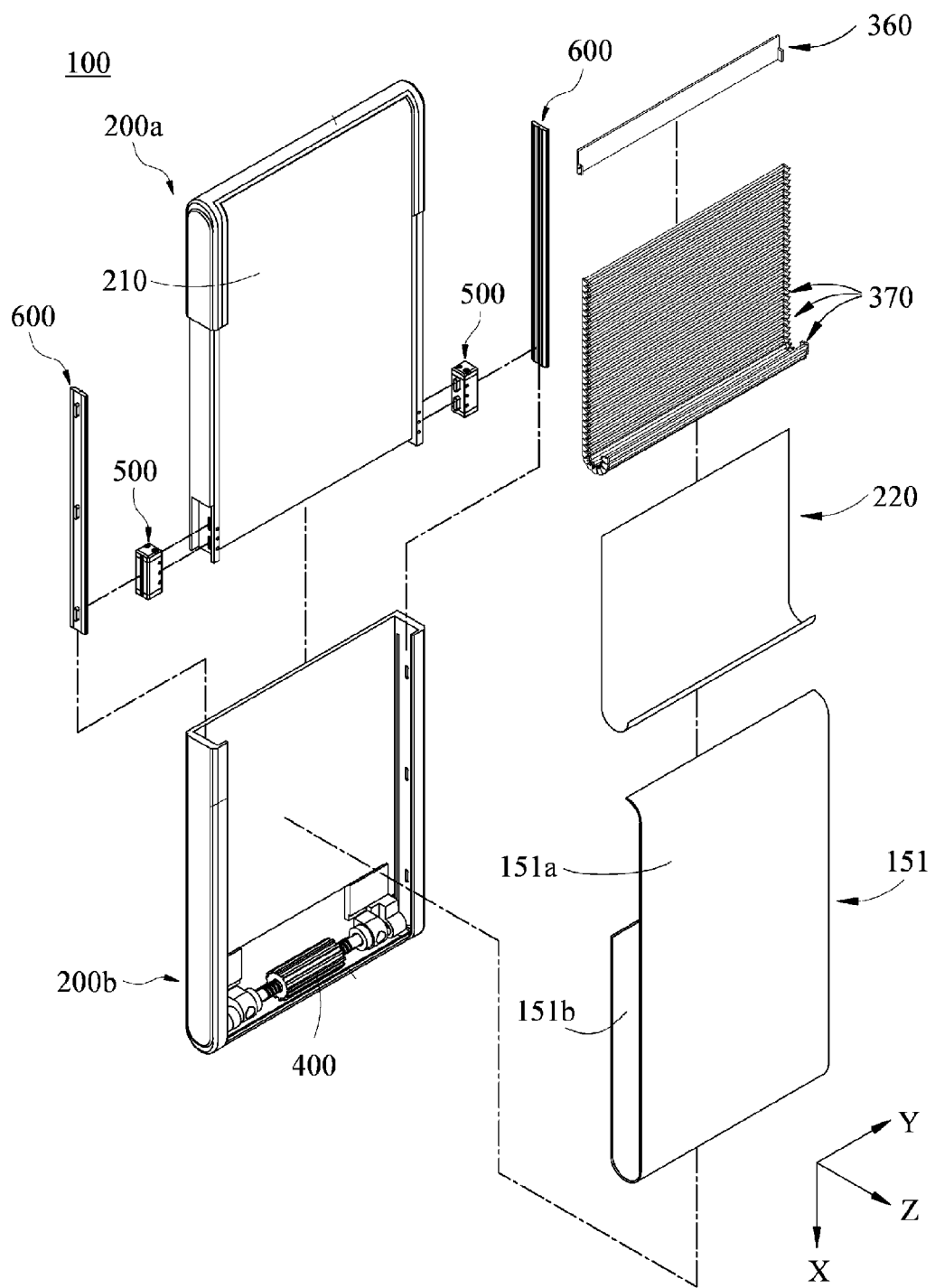
Figure 11D:
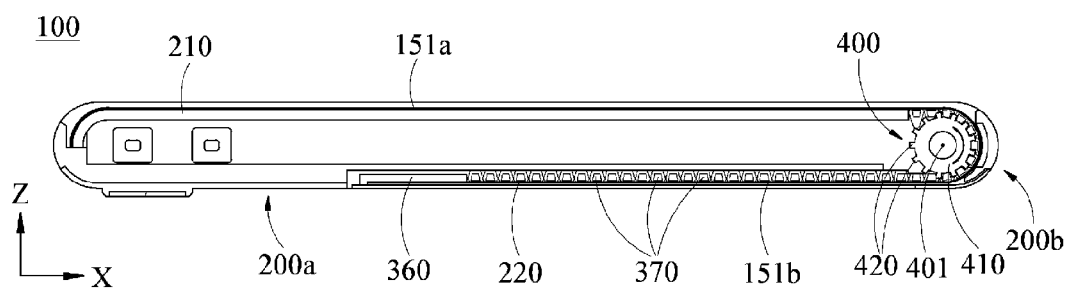
Figure 11E:
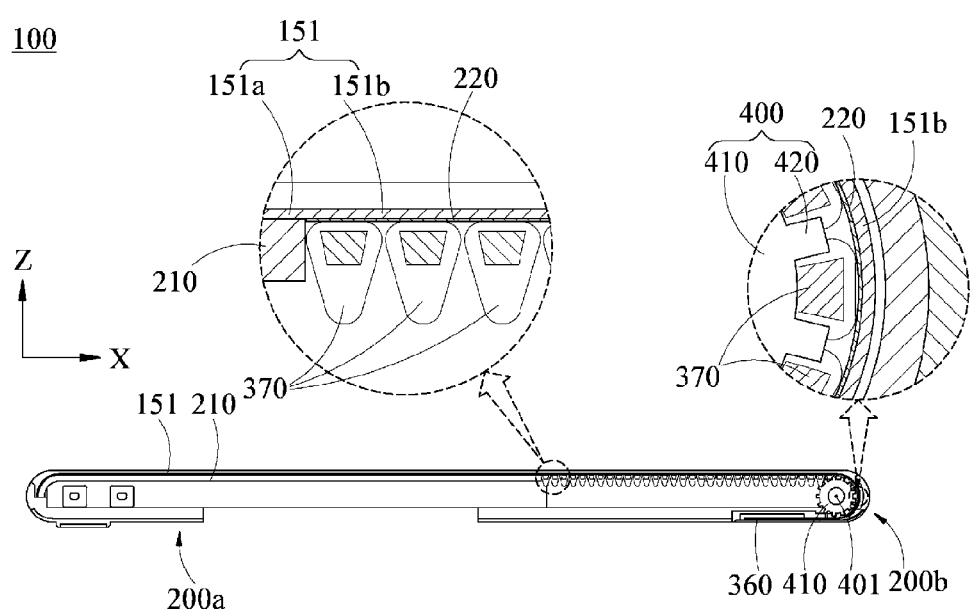

Specifically, FIG. 11A is a perspective view illustrating a first state (for example, a screen reduced state) of an electronic apparatus 100 according to an embodiment, and FIG. 11B is a perspective view illustrating a second state (for example, screen extended state) of the electronic apparatus 100 illustrated in FIG. 11A. FIG. 11C is a schematic exploded perspective view of the electronic apparatus 100 of FIG. 11A. FIG. 11D is a cross-sectional view taken along line B-B' in FIG. 11A. FIG. 11E is a cross-sectional view illustrating a state in which the electronic apparatus 100 of FIG. 11D is transformed into the second state (for example, the screen extended state).

Referring to FIGS. 11A to 11E, the electronic apparatus 100 according to various embodiments of the present disclosure may include a flexible display 151 capable of extending or reducing an area of an image output region facing toward a first direction (for example, the +z direction, and a forward direction of the electronic apparatus 100).

The display 151 may include a first region (for example, a fixed region) 151a exposed through a front side of the electronic apparatus 100 as the image output region regardless of a state (shape) of the electronic apparatus 100, and a second region (for example, a variable region) 151b optionally included in the image output region and exposed through the front side of the electronic apparatus 100 according to a state (shape) of the electronic apparatus 100.

For example, as illustrated in FIGS. 11A and 11D, when the electronic apparatus 100 is in the first state (for example, the screen reduced state), the first region 151a may be included in the image output region to output an image through the front surface of the electronic apparatus 100. Meanwhile, the second region 151b may face a rear side of the electronic apparatus 100 (for example, the −z direction) and may not be included in the image output region. In this case, at least a part of the second region 151b may output an image through the rear side of the electronic apparatus 100.

Meanwhile, as illustrated in FIGS. 11B and 11E, when the electronic apparatus 100 is in the second state (for example, the screen extended state), the first region 151a and the second region 151b each may be included in the image output region.

The electronic apparatus 100 may include a body part (for example, a first body 200a and a second body 200b) which forms an exterior of the electronic apparatus 100, and which serves to mount or support components of the electronic apparatus 100.

For example, the first body 200a and the second body 200b may be formed of a relatively hard material, such as plastic, carbon, metal, or a combination of at least some of them. The first body 200a and the second body 200b may have a generally flat shape or may have a partially curved shape. In addition, the first body 200a and the second body 200b may have a shape in which the inside is entirely filled or may have a shape in which a part of the inside is empty.

According to various embodiments, the first body 200a and the second body 200b may be disposed to slidably move in a direction closer to each other or in a direction away from each other. In addition, in response to movement between the first body 200a and the second body 200b relative to each other, an area of a display region (for example, the image output region) outputting an image toward the front side of the electronic apparatus 100 may vary.

For example, as illustrated in FIGS. 11A and 11D, when substantial portions of the first body 200a and the second body 200b are located to overlap each other as the first body 200a and the second body 200b slidably move in the direction closer to each other, the electronic apparatus 100 may be in the first state (for example, the screen reduced state), and thus, the area of the image output region to output an image in the first direction from the front side of the electronic apparatus 100 may be minimized.

For example, as illustrated in FIGS. 11B and 11E, when the first body 200a and the second body 200b are located to minimize the overlapping portions as the first body 200a and the second body 200b slidably move in the direction away from each other, the electronic apparatus 100 may be in the second state (for example, the screen extended state), and thus, the area of the image output region to output an image in the first direction from the front side of the electronic apparatus 100 may be maximized.

Meanwhile, the electronic apparatus 100 according to various embodiments may include various elements to enable smooth sliding of the first body 200a and the second body 200b or to maintain the display 151 in a constant shape during relative movement between the first body 200a and the second body 200b.

For example, the electronic apparatus 100 may include a first frame 210 supporting a first region (for example, a fixed region) 151a of the display 151, and a second frame 220 supporting a second region (for example, a variable region) 151b of the display 151. The first frame 210 and the second frame 220 may be respectively connected to the first body 200a and the second body 200b to relatively move in response to relative movement between the first body 200a and the second body 200b and support the first region 151a and the second region 151b.

In addition, the electronic apparatus 100 according to an embodiment may further include at least one of a support 400, a bearing 500, a guide rail 600, a support bar 370, or a sliding plate 360.

The guide rail 600 may be disposed in an inner portion of the second body 200b corresponding to the left and right side portions of the electronic apparatus 100, so that the first body 200a and the second body 200b can guide a direction to slidably move relative to each other. The guide rail 600 may have a shape elongated along a direction (the +x direction or the −x direction) in which the second body 200b moves relative to the first body 200a, for example.

The bearing 500 may be disposed between the first body 200a and the second body 200b (for example, between the first body 200a and the guide rail 600), so that a slip or friction possibly occurring in response to the sliding movement of the first body 200a and the second body 200b can be minimized through rolling contact.

The support 400 may be rotated about a central axis 401 in response to relative sliding movement (for example, linear reciprocating motion) of the first body 200a and the second body 200b and may be coupled to the second body 200b, so that a part of a display region, which faces the rear side of the electronic apparatus 100, can be withdrawn toward the front side of the electronic apparatus 100 or, conversely, a part of a display region, which faces the front side of the electronic apparatus 100, can be inserted toward the rear side of the electronic apparatus 100. The support 400 may support a partial region (for example, a display region facing a downward direction (for example, the +x direction) of the electronic apparatus 100) of the display 151. For example, the support 400 may include a support body 410 having a cylinder or cylindrical shape, and a plurality of locking protrusions 420 protruding in a radial direction from an outer circumferential surface of the support body 410.

The support bar 370 may have a shape in which a plurality of bars elongated along the +y direction or the −y direction is arranged in a horizontal direction (for example, the +x direction). The plurality of bars may be disposed to engage with the locking protrusions 420 provided in the support 400 described above, and may linearly move according to a rotational motion of the support 400. For example, the support bar 370 may serve to support the second region 151b of the display 151.

The sliding plate 360 may be fixed to the end of the display 151 (for example, an end of the second region 151b), and may be coupled to the second body 200b while enabled to move (for example, slide) relative to the second body 200b.

According to various embodiments of the present disclosure, an actuator (for example, the actuator 300 of FIG. 3) may be disposed at a rear side of at least one of the first frame 210 and the second frame 220. For example, the electronic apparatus 100 may include at least one of a first actuator disposed at a rear side of the first frame 210 and a second actuator disposed at a rear side of the second frame 220.

According to an embodiment, the electronic apparatus 100 may include at least one actuator disposed only at the rear side of the first frame 210. According to the driving of the at least one actuator, a vibration may occur in the first frame 210 (or the first frame 210 and the second frame 220) and the display 151, thereby causing an acoustic signal to be output to an outside. According to another embodiment, the electronic apparatus 100 may include a first actuator disposed at the rear side of the first frame 210, and a second actuator disposed at the rear side of the second frame 220 (for example, between the second frame 220 and the support bar 370 or at a rear side of the support bar 370).

For example, the first frame 210 according to various embodiments of the present disclosure may include a first portion (for example, an inner portion) and a second portion (for example, an outer portion), which surrounds at least a part of the first portion, on a main surface facing the first region 151a of the display 151.

For example, in one embodiment, the first portion and the second portion may be formed of different materials. For instance, the first portion and the second portion may be formed of materials having different densities and/or different stiffnesses.

In another embodiment, the first portion and the second portion may be formed to have different thicknesses to form a stepped structure. For example, a thickness of the first portion may be smaller than a thickness of the second portion.

In another embodiment, the second portion may have therein at least one opening, at least one shock absorbing structure (for example, a buffer structure), and/or a corrugation structure. The first portion may also optionally have a corrugation structure.

In addition, the second frame 220 according to various embodiments of the present disclosure may also include a third portion (for example, an inner portion) and a fourth portion (for example, an outer portion), which surrounds at least a part of the third portion, on a main surface of the second frame 220 facing the second region 151b of the display 151.

According to various embodiments, the first portion and the second portion may be formed of materials having different densities and/or different stiffnesses, and may have different thicknesses to form a stepped structure. In addition, the fourth portion may have at least one opening or at least one shock absorbing structure, and the third portion and/or the fourth portion may have a corrugation structure.

According to various embodiments, the first frame 210 and the second frame 220 are formed of different properties and different materials, and may have different thicknesses.

For example, the second frame 220 is formed of a material having elasticity, and may have a thickness of 0.05 mm to 0.2 mm.

According to various embodiments, it is possible to provide an electronic apparatus with improved aesthetics by not including a speaker hole in the exterior of the electronic apparatus.

In addition, it is possible to provide a high quality acoustic signal by an electronic apparatus that outputs an acoustic signal through a display.

Although the exemplary embodiments of the present disclosure have been described in detail with reference to the accompanying drawings, the present disclosure is not limited thereto and may be embodied in many different forms without departing from the technical concept of the present disclosure. Accordingly, the embodiments disclosed herein are intended to not limit but describe the technical aspects of the present disclosure and the scope of the present disclosure is not restricted by the embodiments. The protective scope of the present disclosure should be construed based on the following claims, and all the technical concepts in the equivalent scope thereof should be construed as falling within the scope of the present disclosure.

What is claimed is:

1. An electronic apparatus comprising:
a display having a first region and a second region;
a first frame coupled to the first region;
a second frame coupled to the second region;
a first actuator disposed at a rear side of the first frame;
a second actuator disposed at a rear side of the second frame; and
a hinge module coupling the first frame and the second frame such that the first frame and the second frame are foldable in synchronization with each other,
wherein the first frame comprises a first portion and a second portion surrounding the first portion, the first frame supporting the first region of the display from a rear side of the display,
wherein the second frame comprises a third portion and a fourth portion surrounding at least a part of the third portion, the second frame supporting the second region of the display from a rear side of the display,
wherein the first portion is formed of a material different from a material of the second portion and the third portion is formed of a material different from a material of the fourth portion in order to extend a reproduction bandwidth of an acoustic signal,
wherein the fourth portion comprises at least one opening in order to reduce an acoustic impedance, and
wherein a first acoustic signal emitted through the first region of the display and a second acoustic signal emitted through the second region of the display have different acoustic characteristics based on the first frame and the second frame having different structures.

2. The electronic apparatus of claim 1, wherein the first portion and the second portion are formed of materials having at least different densities or different stiffnesses.

3. The electronic apparatus of claim 1, wherein the first portion is thinner than the second portion.

4. The electronic apparatus of claim 1, wherein:
the fourth portion further comprises an impact absorbing structure.

5. The electronic apparatus of claim 1, wherein the display, the first frame, and the second frame are configured to emit the acoustic signal by vibrating based on driving of the first actuator and the second actuator.

6. The electronic apparatus of claim 5, wherein the first actuator and the second actuator comprise:
a magnetic circuit device configured to generate a magnetic force based on an electrical signal; and
a voice coil vibrating by the magnetic circuit device, and
wherein the first frame, the second frame, and the display vibrate according to a vibration of the voice coil to emit the acoustic signal.

7. The electronic apparatus of claim 5, wherein the first acoustic signal transmitted through the first region has a frequency band higher than a frequency band for the second acoustic signal transmitted through the second region.

8. The electronic apparatus of claim 1, wherein the first region and the second region are disposed to face in a same direction or to be opposed to each other based on whether the first frame and the second frame are folded.

9. The electronic apparatus of claim 1, wherein the display comprises a flexible display capable of being folded or unfolded around the hinge module.

* * * * *